United States Patent
Zhang

(10) Patent No.: US 11,468,126 B2
(45) Date of Patent: Oct. 11, 2022

(54) METHOD FOR COLLECTING COMPONENT MODEL IN COMPONENT E-COMMERCE PLATFORM

(71) Applicant: SHENZHEN SEKORM COMPONENT NETWORK CO., LTD, Shenzhen (CN)

(72) Inventor: Jian Zhang, Shenzhen (CN)

(73) Assignee: SHENZHEN SEKORM COMPONENT NETWORK CO., LTD, Shenzhen (CN)

( * ) Notice: Subject to any disclaimer, the term of this patent is extended or adjusted under 35 U.S.C. 154(b) by 0 days.

(21) Appl. No.: 17/485,536

(22) Filed: Sep. 27, 2021

(65) Prior Publication Data

US 2022/0100805 A1 Mar. 31, 2022

(30) Foreign Application Priority Data

Sep. 28, 2020 (CN) .......................... 202011043193.0

(51) Int. Cl.
*G06F 16/93* (2019.01)
*G06F 16/955* (2019.01)
*G06F 16/9535* (2019.01)
*G06F 40/134* (2020.01)

(52) U.S. Cl.
CPC .......... *G06F 16/94* (2019.01); *G06F 16/9535* (2019.01); *G06F 16/9558* (2019.01); *G06F 40/134* (2020.01)

(58) Field of Classification Search
None
See application file for complete search history.

(56) References Cited

U.S. PATENT DOCUMENTS

| 8,553,259 | B2* | 10/2013 | Luo | G06F 3/1265 |
| | | | | 707/706 |
| 10,423,709 | B1* | 9/2019 | Bradley | G06F 16/9577 |
| 10,506,017 | B2* | 12/2019 | Brinkman | H04L 67/02 |
| 10,817,646 | B2* | 10/2020 | Nishida | G06F 40/174 |
| 10,991,031 | B2* | 4/2021 | Nizam | G06Q 30/0633 |
| 2008/0091846 | A1* | 4/2008 | Dang | G06F 40/174 |
| | | | | 709/246 |

(Continued)

OTHER PUBLICATIONS

The extended European search report of the EP application No. 21199088.2 dated Feb. 4, 2022.

*Primary Examiner* — Maikhanh Nguyen
(74) *Attorney, Agent, or Firm* — Andrew C. Cheng

(57) ABSTRACT

A method for collecting a component model in a component e-commerce platform includes: S1: adding preset hyperlinks to component models in a PDF file of the web server; S2: downloading the PDF file from the web server, clicking one preset hyperlink in the downloaded PDF file to jump to a corresponding webpage, and displaying collection information when the web server identifies a link type; and S3: if a collect instruction is received, converting information of the component models included in the preset hyperlinks, and saving the component model information obtained by the conversion into a user personal account. This method allows the user to quickly return from off-line use of the PDF file back to a webpage on which a component model is present, and displays collection information to allow the user to timely collect component information thus improving the user experience of use.

1 Claim, 3 Drawing Sheets

(56) References Cited

U.S. PATENT DOCUMENTS

2012/0297278 A1\* 11/2012 Gattani ................. G06F 16/94
　　　　　　　　　　　　　　　　　　　　　　715/205
2018/0040058 A1　　2/2018 Nizam et al.

\* cited by examiner

METHOD FOR COLLECTING COMPONENT MODEL IN COMPONENT E-COMMERCE PLATFORM

TECHNICAL FIELD

The invention relates to the field of component e-commerce platforms, in particular to a method for collecting a component model in a component e-commerce platform.

DESCRIPTION OF RELATED ART

Component e-commerce platforms include various electronic components, and users can browse, search for and order electronic components via the component e-commerce platforms. To meet the requirements of users for referring to technical files of components when the users select the models of the components, these platforms provide many such technical files for being used by the users. The technical files include a large number of files in PDF formats. Generally, one or more series of components are introduced in one file, that is, one file includes multiple component models.

During browsing the files to pick up components of desired models, users often spend a long time in considering and comparing different models of components, and need to record the models of potential candidate components. Information to be recorded includes the models and attribute information of components. An existing way is making record manually by the user, which is troublesome for users to return to a webpage where an electronic component of a desired model is exhibited when the PDF file including this component is browsed offline, thus leading to low efficiency and poor user experience.

SUMMARY OF THE INVENTION

The technical issue that the present invention aims to resolve is to provide, in view of the above-described deficiency of the prior art, a method for collecting a component model in a component e-commerce platform.

The method for collecting a component model in a component e-commerce platform is applicable to a web server having webpage data and relevant data of various components stored therein, and the method comprises:

S1: adding preset hyperlinks to component models in a PDF file of the web server;

S2: downloading the PDF file from the web server; clicking, by a user, one of the preset hyperlinks in the downloaded PDF file to jump to a corresponding webpage; displaying, by the web server, collection information when the web server identifies a link type; and S3: upon receiving a collect instruction, converting information of the component model in the one of the preset hyperlinks, and saving the component model information obtained by conversion into a user personal account.

In some embodiments, in the method for collecting a component model in a component e-commerce platform, step S1 comprises:

S11: recognizing component models on each page of the PDF file, and determining relevant attribute information of the component models, wherein the relevant attribute information includes page number information of the component models; and S12: setting corresponding preset hyperlinks according to the relevant attribute information of the different component models.

In some embodiments, in the method for collecting a component model in a component e-commerce platform, displaying, by the web server, collection information when the web server identifies a link type in step S2 comprises:

Recognizing, by the web server, whether a webpage type of a webpage corresponding to the one of the preset hyperlinks is a preset type; and If yes, displaying collection prompt information.

In some embodiments, in the method for collecting a component model in a component e-commerce platform, the collection prompt information includes a collection key, and step S3 comprises: if the collection key receives the collect instruction, sending the component model to the web server.

In some embodiments, the step S3 of saving the component model information obtained by conversion into a user personal account comprises: acquiring data in the one of the preset hyperlinks, converting the data into data of a preset storage format, and saving the data of the preset storage format into the user personal account.

In various embodiments of the method for collecting a component model in a component e-commerce platform, preset hyperlinks are added to component models in a PDF file stored in the component e-commerce platform, which allows a user to efficiently return from off-line use of the PDF file back to a webpage on which a component model is present, and displays collection information to allow the user to timely collect component information thus improving the user experience of use.

BRIEF DESCRIPTION OF THE SEVERAL VIEWS OF THE DRAWINGS

The invention will be further described below in conjunction with accompanying drawings and embodiments, wherein.

DETAILED DESCRIPTION OF THE INVENTION

For a better understanding of the technical features, purposes and effects of the invention, specific implementations of the invention will be described in detail below with reference to the accompanying drawings.

Embodiment 1

Figure 1:
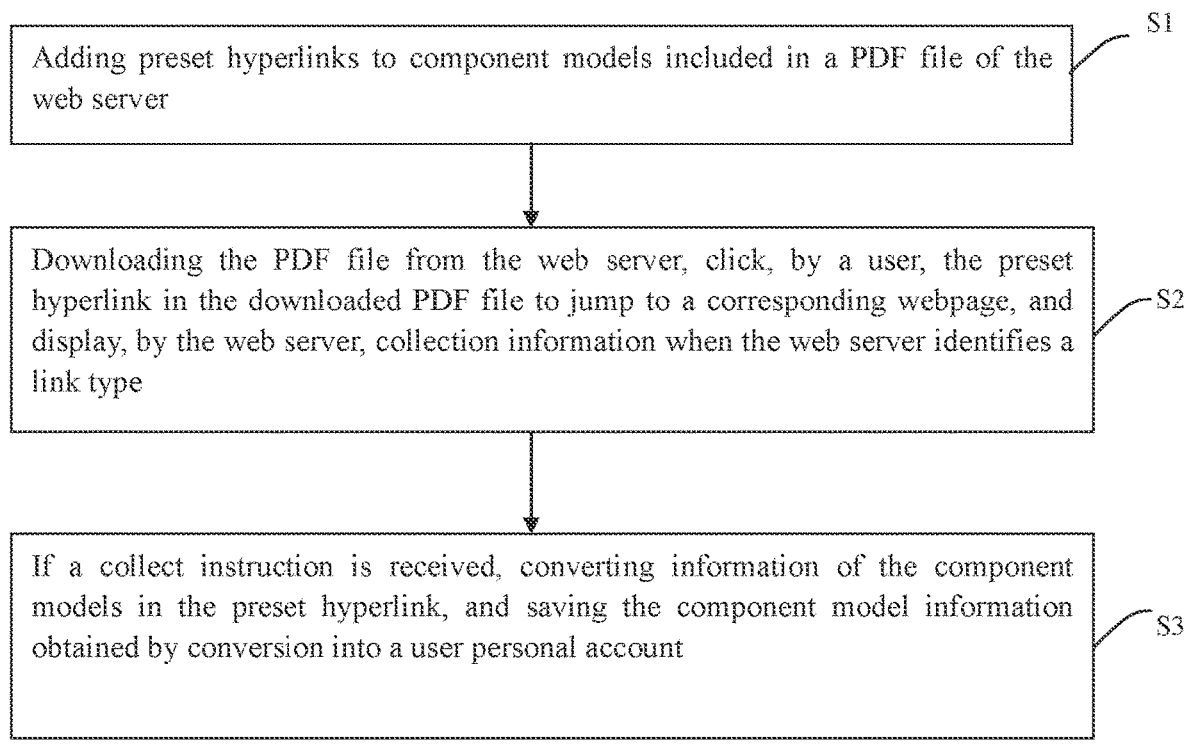
FIG. 1 is a flowchart of a method for collecting a component model in a component e-commerce platform according to an embodiment of the present invention.

Referring to FIG. 1, this embodiment provides a method for collecting a component model in a component e-commerce platform, which is applicable to a web server having webpage data and relevant data of various components stored therein. Users may access the web server by means of an intelligent terminal to search for, browse and purchase components and download data. The relevant data of the components include PDF files which include model information, parameter information, usage instruction information, performance information, circuit diagrams, and the like, of the components, and the users may get knowledge of the electronic components by reading contents in the PDF files. It may be understood that one PDF file may include multiple component models. Optionally, the intelligent terminal may be selected as one of a desktop computer, a notebook computer, a tablet computer, a smartphone, or the like. Specifically, the method for collecting a component model in a component e-commerce platform comprises the following steps:

S1: adding preset hyperlinks to component models in a PDF file of the web server.

Specifically, PDF files of the components are often provided by component suppliers or by management staff of the component e-commerce platform, and these PDF files do not contain hyperlinks before being saved into a web server of the component e-commerce platform. That is, these PDF files are merely regular PDF files. After these PDF files are saved in the web server, the web server processes the PDF files by means of a preset algorithm to add the preset hyperlinks to the component models in the PDF files saved in the web server.

S2: downloading the PDF file from the web server; clicking, by the user, one of the preset hyperlinks in the downloaded PDF file to jump to a corresponding webpage; and displaying, by the web server, collection information when the web server identifies a link type.

Specifically, the web server of the component e-commerce platform provides a download service to the user, so that the user can download the PDF files that have been processed to contain the hyperlinks. After downloading the PDF file to the local intelligent terminal, the user opens the PDF file using a corresponding PDF reader to browse contents in the PDF file. If the user has an interest in contents corresponding to a specific hyperlink when browsing the contents in the PDF file, he or she may click the specific hyperlink in the downloaded PDF file to jump to a corresponding webpage, and the web server displays collection information when recognizing a link type. That is to say, the hyperlinks in the PDF file include website information, and when any of the hyperlinks in the PDF file receives a jump instruction, an explorer on the intelligent terminal is automatically called to open a webpage corresponding to the hyperlink.

S3: upon receiving a collect instruction, converting information of the component model included in the preset hyperlink, and saving the component model information obtained by conversion into a user personal account.

Specifically, if the user has an interest in contents corresponding to a specific hyperlink when browsing the contents in the PDF file, the user clicks the specific hyperlink in the downloaded PDF file to jump to a corresponding webpage, and the web server displays collection information when recognizing a link type. If a collect instruction from the user is received after the collection information is displayed, information of the component model included in the preset hyperlink is converted, and the information obtained after conversion is saved into a user personal account. The user personal account is a user account registered on the component e-commerce platform by the user, and each user possesses a corresponding user personal account, and a certain storage space is allocated for each user personal account on the web server for storing the collection information. Optionally, the user may generate the collect instruction by means of a mouse, a keyboard, a touch screen, or the like.

The instant embodiment features adding preset hyperlinks to a PDF file in a component e-commerce platform to allow a user to efficiently return from off-line use of the PDF file back to a webpage on which a component model is present, and displaying collection information to allow the user to timely collect component information thus improving the user experience of use.

Embodiment 2

Figure 2:
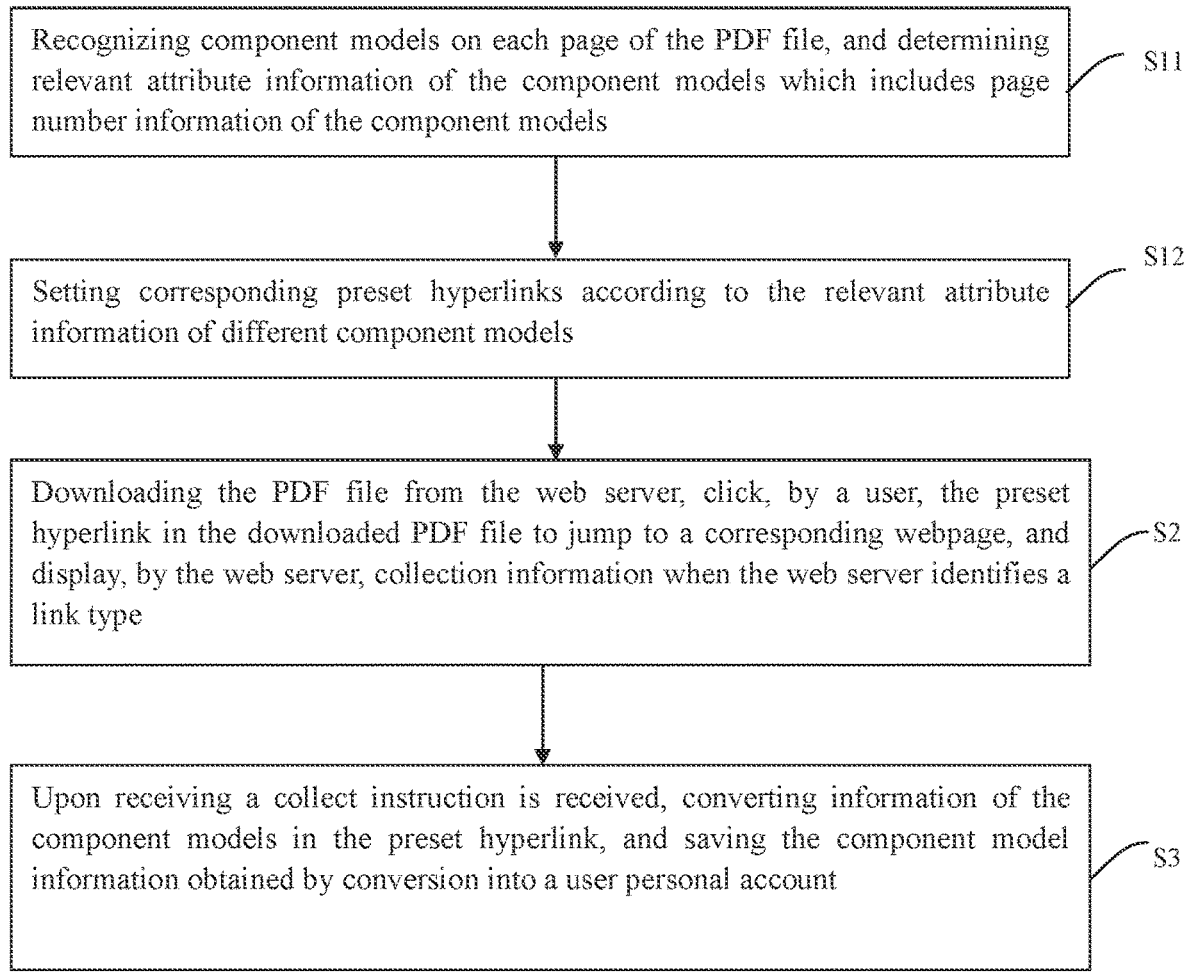
FIG. 2 is a flowchart of a method for collecting a component model in a component e-commerce platform according to another embodiment of the present invention.

Referring to FIG. 2, this embodiment provides a method for collecting a component model in a component e-commerce platform, which is applicable to a web server having webpage data and relevant data of various components stored therein. Users may access the web server by means of an intelligent terminal to search for, browse and purchase components and download data. The relevant data of the components include PDF files which include model information, parameter information, usage instruction information, performance information, circuit diagrams, and the like, of the components. The users may get knowledge of the electronic components by reading contents in the PDF files. It may be understood that one PDF file may include multiple component models. Optionally, the intelligent terminal may be a desktop computer, a notebook computer, a tablet computer, a smartphone, or the like. Specifically, the method for collecting a component model in a component e-commerce platform comprises the following steps:

S11: recognizing component models on each page of a PDF file, and determining relevant attribute information of the component models, wherein the relevant attribute information includes page number information of the component models.

Specifically, PDF files of relevant data of components are often provided by component suppliers or by management staff of the component e-commerce platform, and these PDF files do not contain hyperlinks before being saved into a web server of the component e-commerce platform, that is, these PDF files are merely regular PDF files. After these PDF files are saved in the web server, the web server processes the PDF files by a preset algorithm to recognize component models on each page of the PDF files and determine relevant attribute information of the component models, wherein the relevant attribute information include page number information of the component models. It may be understood that one page of the PDF files may include multiple different component models, and in this case, relevant attribute information of each component model needs to be determined, wherein the relevant attribute information includes page number information of the component models. Optionally, if one page of the PDF files includes multiple identical component models, one of the identical component models may be selected for determining the relevant attribute information of the component model, wherein the relevant attribute information includes page number information of the component models. Optionally, the process of recognizing the component models on each page of the PDF file may be implemented with reference to the prior art.

S12: setting corresponding preset hyperlinks according to the relevant attribute information of the different component models.

Specifically, after the relevant attribute information of each component model in the PDF file is read, a corresponding preset hyperlink is set according to the relevant attribute information of each different component model, wherein each preset hyperlink includes a webpage address corresponding to the component model and relevant attribute information of the component model. The component models may be displayed in a highlighted marking manner after the component models are set as the preset hyperlinks, that is, during setting the component models as the hyperlinks, the display manner of the component models is modified at the same time, such that users may easily realize that preset hyperlinks have been set for the component models. Optionally, the preset hyperlinks are displayed, but not limited to, with underlines, with highlights, in italics, in bolds, and in colors, which allow the users to distinguish the hyperlinks from other contents.

S2: downloading the PDF file from the web server, clicking, by a user, the preset hyperlink in the downloaded PDF file to jump to a corresponding webpage, and displaying, by the web server, collection information when the web server identifies a link type.

Specifically, the web server of the component e-commerce platform provides a download service to the user, so that the user can download the PDF file that has been processed to contain the hyperlinks. After downloading the PDF file to the local intelligent terminal, the user opens the PDF file by means of a corresponding PDF reader to browse contents in the PDF file. If the user has an interest in relevant contents corresponding to one specific hyperlink when browsing the contents in the PDF file, he or she may click the specific preset hyperlink in the downloaded PDF file to jump to a corresponding webpage, and the web server displays collection information when identifying a link type. That is to say, the hyperlinks in the PDF file include website information, and when any of the hyperlink in the PDF file receives a jump instruction, an explorer on the intelligent terminal is automatically called to open a website corresponding to the hyperlink being clicked.

S3: upon receiving a collect instruction, converting information of the component model included in the preset hyperlink, and saving the component model information obtained by conversion into a user personal account.

Specifically, if the user has an interest in relevant contents corresponding to one specific hyperlink when browsing the contents in the PDF file, the user clicks the specific preset hyperlink in the downloaded PDF file to jump to a corresponding webpage, and the web server displays collection information when recognizing a link type. If a collect instruction from the user is received after the collection information is displayed, information of the component model included in the hyperlink is converted, and the component model information obtained after conversion is saved into a user personal account. The user personal account is a user account registered on the component e-commerce platform by the user, and each user possesses a corresponding user personal account, and a certain storage space is allocated for each user personal account in the web server to store the storage information. Optionally, the user may generate the collect instruction by means of a mouse, a keyboard, a touch screen, or the like.

The instant embodiment features adding preset hyperlinks to a PDF file in a component e-commerce platform to allow a user to efficiently return from off-line use of the PDF file back to a webpage on which a component model is present, and displaying collection information to allow the user to timely collect component information thus improving the user experience of use.

Embodiment 3

Figure 3:
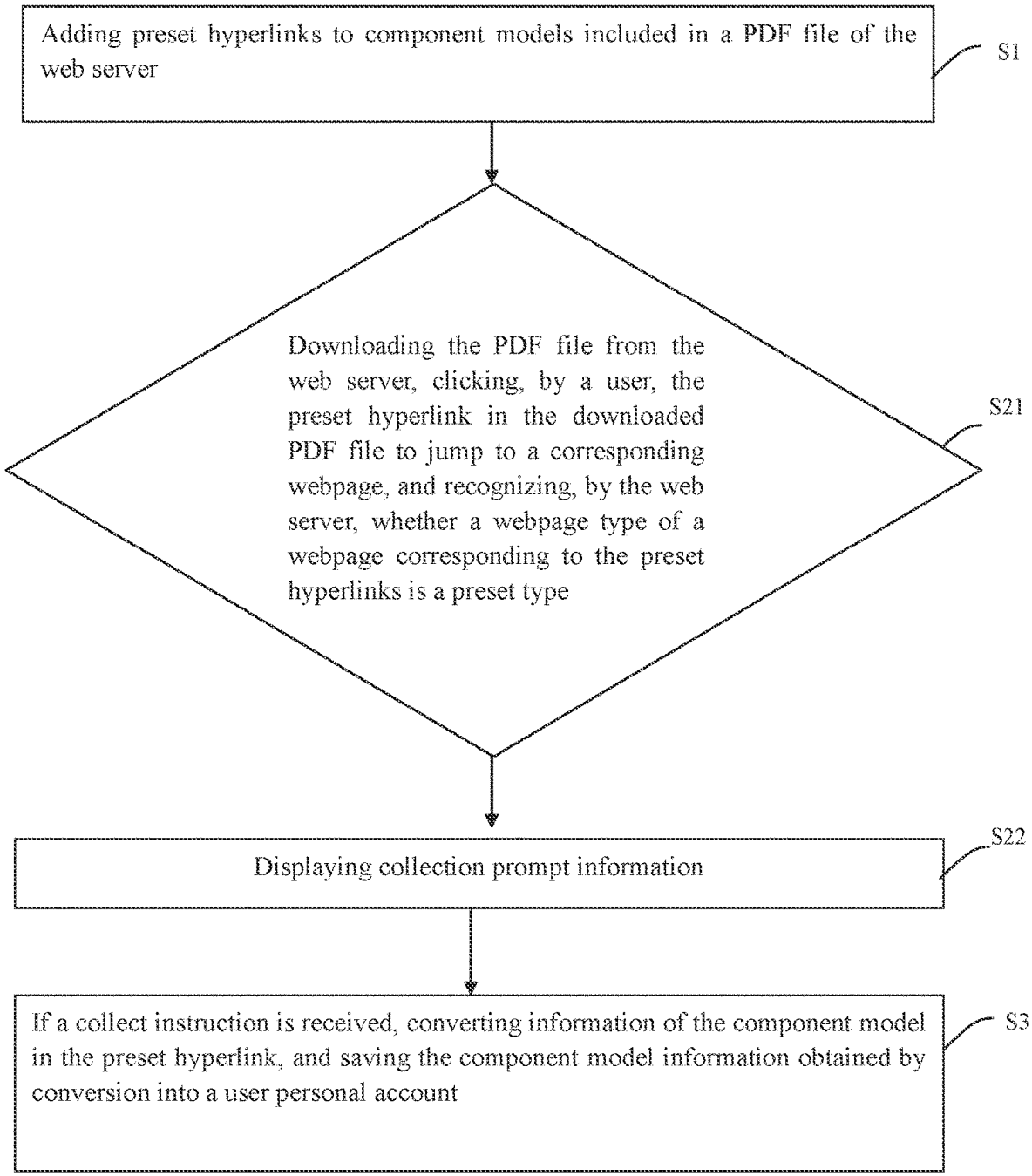
FIG. 3 is a flowchart of a method for collecting a component model in a component e-commerce platform according to still another embodiment of the present invention.

Referring to FIG. 3, this embodiment provides a method for collecting a component model in a component e-commerce platform, which is applied to a web server having webpage data and relevant data of various components stored therein. Users may access the web server by means of an intelligent terminal to search for, browse and purchase components and download data. The relevant data of the components include PDF files, the PDF files include model information, parameter information, usage instruction information, performance information, circuit diagrams, and the like, of the components, and the users may get knowledge of the electronic components by reading contents in the PDF files. It may be understood that one PDF file may include multiple component models. Optionally, the intelligent terminal may be selected as a desktop computer, a notebook computer, a tablet computer, a smartphone, or the like. Specifically, the method for collecting a component model in a component e-commerce platform comprises the following steps:

S1: adding preset hyperlinks to component models in a PDF file of the web server.

Specifically, PDF files of relevant data of components are mostly provided by component suppliers or by management staff of component e-commerce platform, and these PDF files do not contain hyperlinks before being saved into a web server of the component e-commerce platform, that is, these PDF files are merely regular PDF files. After these PDF files are saved in the web server, the web server processes the PDF files by a preset algorithm to add preset hyperlinks to component models in the PDF files in the web server.

S21: downloading the PDF file from the web server, clicking, by a user, the preset hyperlink in the downloaded PDF file to jump to a corresponding webpage, and recognizing, by the web server, whether a webpage type of a webpage corresponding to the preset hyperlink is a preset type.

Specifically, the web server of the component e-commerce platform provides a download service to the user, so that the user can download the PDF file that has been processed to contain the hyperlinks. After downloading the PDF file to the local intelligent terminal, the user opens the PDF file by means of a corresponding PDF reader to browse contents in the PDF file. If the user has an interest in relevant contents corresponding to one specific hyperlink when browsing the contents in the PDF file, he or she may click the specific preset hyperlink in the downloaded PDF file to jump to a corresponding webpage, and the web server displays collection information when recognizing a link type. That is to say, the hyperlinks in the PDF file include website information, and when the hyperlink in the PDF file receives a jump instruction, an explorer on the intelligent terminal is automatically called to open a website corresponding to the hyperlink. After the explorer opens the website corresponding to the hyperlink, the web server recognizes whether a webpage type of a webpage corresponding to the preset hyperlink is a preset type.

S22: if the webpage type of the webpage corresponding to the preset hyperlink is the preset type, displaying collection prompt information.

S3: if a collect instruction is received, converting information of the component model included in the hyperlink, and saving the component model information obtained by conversion into a user personal account.

Specifically, if the user is interested in relevant contents corresponding to a certain hyperlink when browsing the contents in the PDF file, the user clicks the preset hyperlink in the downloaded PDF file to jump to a corresponding webpage, and the web server displays collection information when recognizing a link type. If a collect instruction from the user is received after the collection information is displayed, information of the component model included in the hyperlink is converted, and the component model information obtained after conversion is saved in a user personal account. The user personal account is a user account registered on the component e-commerce platform by the user, and each user possesses a corresponding user personal account, and a certain storage space is allocated for each user personal account in the web server to store the collection information. Optionally, the user may generate the collect instruction by means of a mouse, a keyboard, a touch screen, or the like.

All component models collected in the user personal account and webpage number information and data corresponding to the component models are displayed in the form of a list or table, recorded information of each component model and corresponding webpage and data is displayed in one row, and the order of the list may be set as needed. For example, the order of the list is based on the name or collection time of the component models. If a download instruction is received with respect to the recorded information of a webpage or data corresponding to one component model in the user personal account, the webpage or data corresponding to the selected piece of recorded information is downloaded from the web server. Optionally, the download instruction is generated by a mouse or a touch screen. Optionally, a download button may be set below each piece of recorded information, such that the user may quickly download the webpage or data corresponding to the selected piece of recorded information from the web server to a local terminal by clicking the corresponding download button.

The instant embodiment features adding preset hyperlinks to a PDF file in a component e-commerce platform to allow a user to efficiently return from off-line use of the PDF file back to a webpage on which a component model is present, and displaying collection information to allow the user to timely collect component information thus improving the user experience of use.

Optionally, on the basis of the above embodiments, in the method for collecting a component model in a component e-commerce platform of some embodiments, the collection prompt information includes a collection key, and step S3 comprises: if the collection key receives a collect instruction, sending the component model to the web server.

Optionally, on the basis of the above embodiments, in the method for collecting a component model in a component e-commerce platform of some embodiments, saving the component model information obtained by conversion into a user personal account in step S3 comprises: acquiring data in the preset hyperlink, converting the data into data of a preset storage format, and saving the data of the preset storage format into the user personal account. Data in the present hyperlink is usually stored in a different format from the data stored in the user personal account. Therefore, in this embodiment, the storage format of the data in the preset hyperlink is converted into the storage format of the data in the user personal account, and the data so converted is then saved into the user personal account.

The instant embodiment features adding preset hyperlinks to a PDF file in a component e-commerce platform to allow a user to efficiently return from off-line use of the PDF file back to a webpage on which a component model is present, and displaying collection information to allow the user to timely collect component information thus improving the user experience of use.

A progressive way is adopted to illustrate various embodiments of the disclosure. The description of each embodiment focuses on key features that are different from those of other embodiments. Similar parts of the various embodiments may refer to each other. For the devices disclosed in the embodiments, since they are corresponding to the methods disclosed in the embodiments, and the descriptions thereof are relatively simplified, and the related parts may refer to the descriptions of the methods.

Those skilled in the art would appreciate that illustrative units and algorithm steps described in conjunction with the embodiments disclosed in this specification may be implemented by electronic hardware, computer software, or combinations thereof. To clearly explain the interchangeability between hardware and software, components and steps of the illustrative embodiments have been described above according to functions. Whether these functions are implemented by hardware or software depends on specific applications and design constraints of the technical solutions. Those skilled in the art may fulfill the functions described above in different ways according to specific applications, which should not be regarded as exceeding the scope of the invention.

The steps of method or algorithm described in conjunction with the embodiments disclosed in this specification may be implemented directly by hardware, software modules executed by a processor, or combinations thereof. The software modules may be loaded in a random memory (RAM), a read-only memory (ROM), an electrically programmable ROM, an electrically erasable programmable ROM, a register, a hard disk, a removable disk, a CD-ROM, or any other common storage media in the art.

The above embodiments are merely used to explain the technical concepts and features of the invention for the purpose of allowing those skilled in the art to gain a good understanding of the contents of the invention and implement the invention according to the contents, and are not intended to limit the protection scope of the invention. All equivalent variations and embellishments made within the scope of the claims of the invention should also fall within the protection scope defined by the claims.

The invention claimed is:

1. A method for collecting a component model in a component e-commerce platform, the method executed by a processor of a web server having webpage data and relevant data of various components stored therein, the method comprising:
   S1: adding preset hyperlinks to component models included in a Portable Document Format (PDF) file of the web server;
   S2: downloading the PDF file from the web server, clicking, by a user, one of the preset hyperlinks in the downloaded PDF file to jump to a corresponding webpage, and displaying, by the web server, collection information when the web server identifies a link type; and
   S3: upon receiving a collect instruction, converting information of the component model included in the one of the preset hyperlinks, and saving the component model information obtained by the conversion into a user personal account,
   wherein the step S1 comprises:
      S11: recognizing component models on each page of the PDF file, and determining relevant attribute information of the component models, the relevant attribute information including page number information of the component models; and
      S12: setting corresponding preset hyperlinks according to the relevant attribute information of different component models, wherein displaying, by the web server, collection information when the web server identifies a link type in the step S2 comprises: recognizing, by the web server, whether a webpage type of a webpage corresponding to the one of the preset hyperlinks is a preset type; and if yes, displaying collection prompt information, wherein the collection prompt information includes a collection key, and the step S3 comprises: if the collection key receives the collect instruction, sending the component model to the web server, and wherein saving the component model information obtained by the conversion into a user personal account in the step S3 comprises: acquiring data in the one of the preset hyperlinks, converting the data into data of a preset storage format, and saving the data of the preset storage format into the user personal account.

* * * * *